United States Patent
Seki

(10) Patent No.: US 8,724,163 B2
(45) Date of Patent: May 13, 2014

(54) OPTICAL SCANNING APPARATUS, LIGHT POWER CONTROL METHOD, AND IMAGE FORMING APPARATUS FOR ADJUSTING DRIVE CURRENT SUPPLIED TO THE LIGHT SOURCE

(75) Inventor: Yuichi Seki, Saitama (JP)

(73) Assignee: Canon Kabushiki Kaisha (JP)

( * ) Notice: Subject to any disclaimer, the term of this patent is extended or adjusted under 35 U.S.C. 154(b) by 1555 days.

(21) Appl. No.: 12/163,404

(22) Filed: Jun. 27, 2008

(65) Prior Publication Data
US 2009/0010571 A1  Jan. 8, 2009

(30) Foreign Application Priority Data
Jul. 2, 2007  (JP) ................. 2007-174570

(51) Int. Cl.
*G06K 15/12*  (2006.01)

(52) U.S. Cl.
USPC ............ 358/1.7; 358/483; 358/481; 358/474; 358/475; 358/406; 358/509; 358/505; 358/504; 347/237; 347/233; 347/225; 347/224; 347/244; 347/247; 347/248; 347/252; 347/253; 347/261

(58) Field of Classification Search
USPC ......... 347/237, 224, 225, 233, 235, 244, 247, 347/248, 250, 252, 253, 261; 358/483, 481, 358/474, 475, 509, 504, 406, 505; 382/321
See application file for complete search history.

(56) References Cited

U.S. PATENT DOCUMENTS

| | | | | |
|---|---|---|---|---|
| 7,835,040 B2 * | 11/2010 | Seki | ............... | 358/481 |
| 2004/0262618 A1 * | 12/2004 | Oba et al. | ............... | 257/79 |
| 2005/0206964 A1 * | 9/2005 | Hata et al. | ............... | 358/448 |
| 2006/0256417 A1 * | 11/2006 | Seki et al. | ............... | 359/201 |
| 2007/0159657 A1 * | 7/2007 | Nakano et al. | ............... | 358/3.13 |
| 2007/0201110 A1 * | 8/2007 | Seki | ............... | 358/484 |
| 2008/0266375 A1 * | 10/2008 | Seki | ............... | 347/237 |

FOREIGN PATENT DOCUMENTS

JP  2005-262485 A  9/2005

* cited by examiner

*Primary Examiner* — Benny Q Tieu
*Assistant Examiner* — Quyen V Ngo
(74) *Attorney, Agent, or Firm* — Rossi, Kimms & McDowell LLP

(57) ABSTRACT

An optical scanning apparatus includes a light source, rotational polygonal mirror, correction data calculating unit, modification computing unit, and adjustment unit. The adjustment unit adjusts drive current supplied to the light source using the correction data calculated by the correction data calculating unit when a first of a plurality of modes is selected or using the correction data calculated by the modification computing unit when a second of the plurality of modes is selected.

5 Claims, 13 Drawing Sheets

OPTICAL SCANNING APPARATUS, LIGHT POWER CONTROL METHOD, AND IMAGE FORMING APPARATUS FOR ADJUSTING DRIVE CURRENT SUPPLIED TO THE LIGHT SOURCE

BACKGROUND OF THE INVENTION

1. Field of the Invention

The present invention relates to a light power control method for an optical scanning apparatus used on an image forming apparatus.

2. Description of the Related Art

In maintaining image quality on an image forming apparatus of an electrophotographic type, it is important to accurately control light power of an optical scanning apparatus which outputs a laser beam used to form a latent image. Generally, light power control involves controlling a relationship between drive current delivered to a light source and light power of a light beam emitted from a light source.

Generally, on an optical scanning apparatus, an FFP (far-field pattern) and optical axis fluctuate due to differences in image height and light power. To deal with this, Japanese Patent Laid-Open No. 2005-262485 discloses a technique which segments each scanning line into multiple correction sections and determines correction data for each correction section. Furthermore, Japanese Patent Laid-Open No. 2005-262485 proposes to calculate, by interpolation, correction data applicable to an image of any image height and control light power using the calculated correction data.

The invention described in Japanese Patent Laid-Open No. 2005-262485 is very good at maintaining image quality by correcting unevenness of optical characteristics dependent on laser and an optical system. However, there is no fixed relationship among correction data for the different levels of a light power, and the technique must calculate correction data for the different levels of light power separately. Consequently, the invention described in Japanese Patent Laid-Open No. 2005-262485 may require extended computation time.

Furthermore, when updating the correction data, the technique involves transferring items of correction data equal in number to the total number of correction blocks in one scanning line multiplied by the number of beams in semiconductor laser. This tends to extend transfer time. Attempts to shorten the transfer time will involve the need for circuits capable of high-speed transfer, which may result in increased circuit scales.

SUMMARY OF THE INVENTION

It is a feature of the present invention to solve at least one of the above and other problems. For example, a feature of the present invention is to reduce the time required for light power control while maintaining image quality. Other problems will become apparent from the entire specification.

The present invention can be implemented, for example, as an optical scanning apparatus, light power control method, and image forming apparatus. The optical scanning apparatus includes a light source which outputs a light beam and a rotational polygonal mirror which deflects the light beam while in rotation such that the light beam scans on an image carrier. A determination unit determines a drive current of the light source as a setting value of light power, the drive current being used uniformly for different image heights on the image carrier. A correction data calculating unit obtains light power at each of a plurality of image heights on the image carrier, substitutes the setting value of light power into an approximate expression for correction obtained from differences between the light power at a given image height and the light power at the other image heights, and thereby calculates correction data. A storage unit stores the calculated correction data. When the setting value of light power is changed, a modification coefficient calculating unit calculates a modification coefficient by multiplying a difference between the setting value of light power before the change and the setting value of light power after the change by a predetermined correction coefficient. A modification computing unit calculates modified correction data by multiplying the correction data stored in the storage unit by the calculated modification coefficient. An adjustment unit adjusts the drive current supplied to the light source using the correction data calculated by the correction data calculating unit when a first of a plurality of modes is selected or using the correction data calculated by the modification computing unit when a second of the plurality of modes is selected.

Further features of the present invention will become apparent from the following description of exemplary embodiments (with reference to the attached drawings).

DESCRIPTION OF THE EMBODIMENTS

Embodiments of the present invention will be described below. The individual embodiments described below will be useful in understanding various concepts of the present invention including superordinate concepts, subordinate concepts, and lower subordinate concepts. It is to be understood that the technical scope of the present invention is defined only by the appended claims, and is not limited to any particular embodiment described below.

First Embodiment

[Equipment Configuration]

Figure 1:
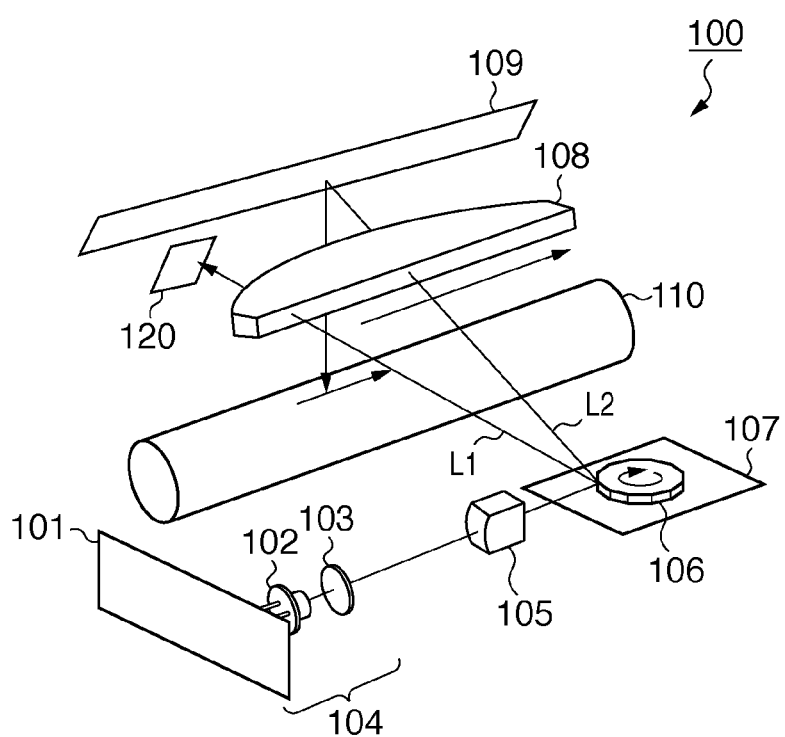
FIG. 1 is a diagram showing an optical scanning apparatus according to a first embodiment.

FIG. 1 is a diagram showing an optical scanning apparatus according to a first embodiment. Incidentally, the optical scanning apparatus 100 is sometimes called an exposure device or scanner. The optical scanning apparatus 100 includes a laser unit 104 which in turn includes a laser drive unit 101, semiconductor laser 102, and collimating lens 103. The semiconductor laser 102 is only an example of the light source which outputs an optical beam, and another type of light source may be used alternatively.

A laser beam (light beam) emitted from the semiconductor laser 102 passes through a cylindrical lens 105 and reaches a polygonal mirror 106. The polygonal mirror 106 is an example of the rotational polygonal mirror which deflects the light beam while in rotation such that the light beam scans on an image carrier. A scanner unit 107 drives the polygonal mirror 106, causing the polygonal mirror 106 to rotate with uniform angular velocity. The laser beam deflected by the polygonal mirror 106 is incident upon an f-θ lens 108. After passing through the f-θ lens 108, a laser beam L2 is reflected by a reflecting mirror 109, and then scans and exposes a surface of a photosensitive drum 110. The f-θ lens 108 transforms the laser beam L2 such that a trajectory of the laser beam L2 will move with uniform motion in a direction (main scanning direction) perpendicular to a rotation direction (sub-scanning direction) of the photosensitive drum 110. The laser beam L2 causes a latent image to be formed on the surface of the photosensitive drum 110.

On the other hand, a laser beam L1 is located on an edge of a scanning range of the laser beam and is not used for image formation. Instead, the laser beam L1 is received by a BD sensor 120, where BD stands for beam detection. An output signal from the BD sensor 120 is used to indicate an image write timing.

Figure 2:
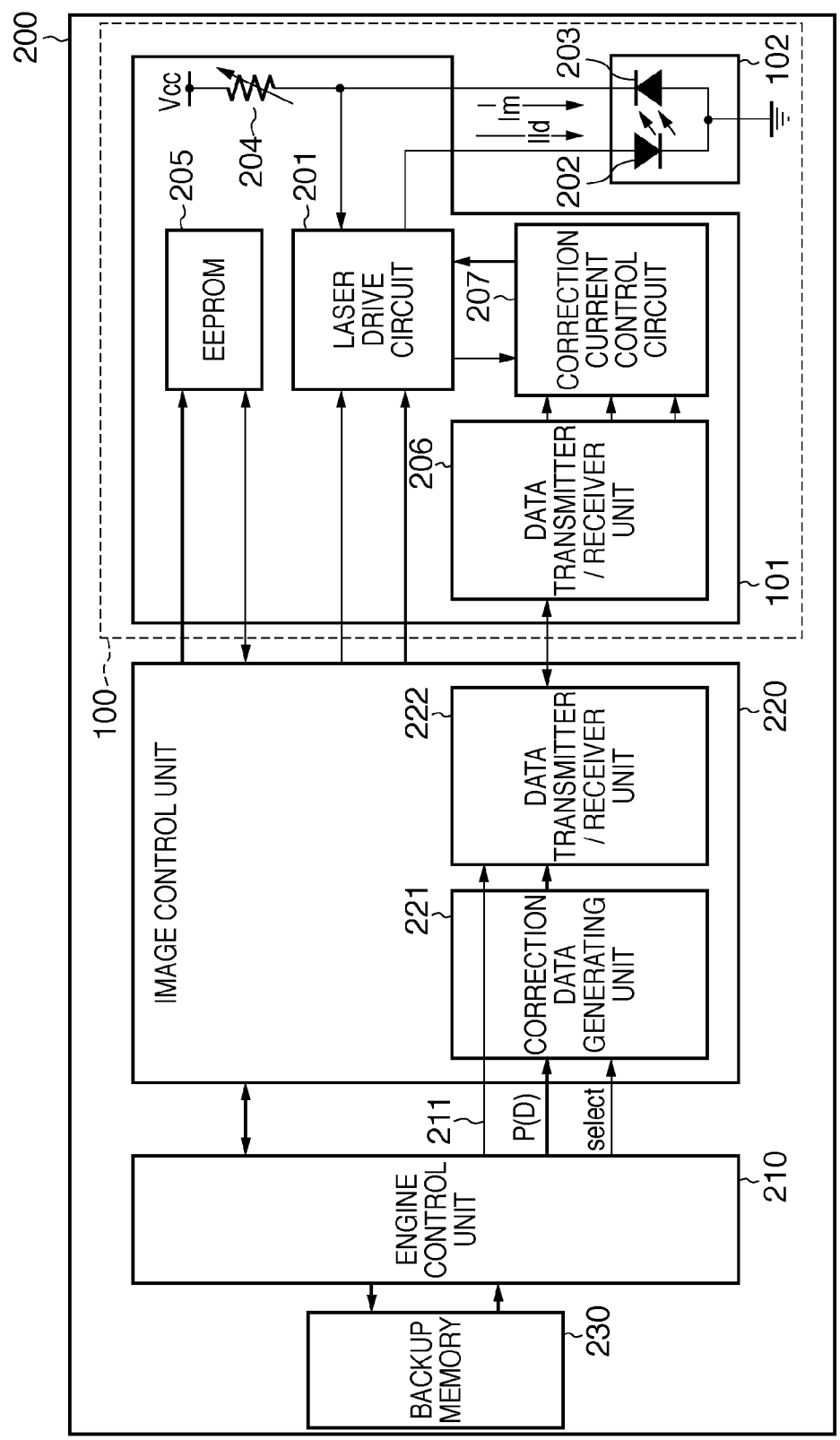
FIG. 2 is a block diagram showing a control unit of an image forming apparatus according to the first embodiment.

FIG. 2 is a block diagram showing a control unit of an image forming apparatus according to the present embodiment, where the same reference numerals as those in FIG. 1 are denoted by the same reference numerals as the corresponding components in FIG. 1. The image forming apparatus includes the optical scanning apparatus 100. The optical scanning apparatus 100 is used to form a latent image by scanning a surface of an image carrier with a light beam according to image information.

A laser drive circuit 201 controls drive current of the semiconductor laser 102 and thereby causes the semiconductor laser 102 to emit light uniformly at predetermined light power (intensity). The semiconductor laser 102 includes an LD 202 and PD 203, where LD stands for laser diode and PD stands for photodiode. The LD 202 is a light source which outputs a laser beam. The PD 203 is a measuring element which measures the light power of the laser beam. The laser drive circuit 201 outputs a drive current Ild to the LD 202 according to the light power (PD current Im) measured by the PD 203. A light power adjusting variable resistor 204 converts the PD current Im into a voltage value, and thereby generates and outputs a PD voltage signal to the laser drive circuit 201.

An EEPROM 205 is a non-volatile storage device. A data transmitter/receiver unit 206 is a communications circuit which exchanges data with a data transmitter/receiver unit 222 of an image control unit 220 described later. The communications circuit may be, for example, a serial communications circuit. A correction current control circuit 207 controls the laser drive circuit according to a control signal received by the data transmitter/receiver unit 206.

An engine control unit 210 controls the image control unit 220 and stores information outputted from the EEPROM 205 in a backup memory 230 via the image control unit 220. According to the present embodiment, the engine control unit 210 functions as a determination unit which determines a setting value of light power. The setting value of light power is a drive current supplied to the light source and is used uniformly for different image heights on the image carrier. The engine control unit 210 generates and outputs a light power setting signal 211 to the image control unit 220. The light power setting signal 211 is used to transmit a setting value D of light power, where the setting value D of light power is used to set the light power of the LD 202. To obtain the setting value D of light power, for example, a print density setting entered via a control panel may be converted into a light power value by the engine control unit 210. The engine control unit 210 may output an approximate expression for correction or data selection signal to the image control unit 220. Details of the approximate expression for correction and data selection signal will be described later.

The image control unit 220, which is one of the control units mounted on the image forming apparatus, mediates data exchange between the engine control unit 210 and optical scanning apparatus 100. For example, the image control unit 220 outputs data and information read out of the EEPROM 205 to the engine control unit 210 and generates and outputs a differential data signal to the laser drive circuit 201 by processing signals from a data control unit (not shown). A correction data generating unit 221 generates correction data used to correct light power and outputs the correction data to the optical scanning apparatus 100 via the data transmitter/receiver unit 222.

Figure 3:
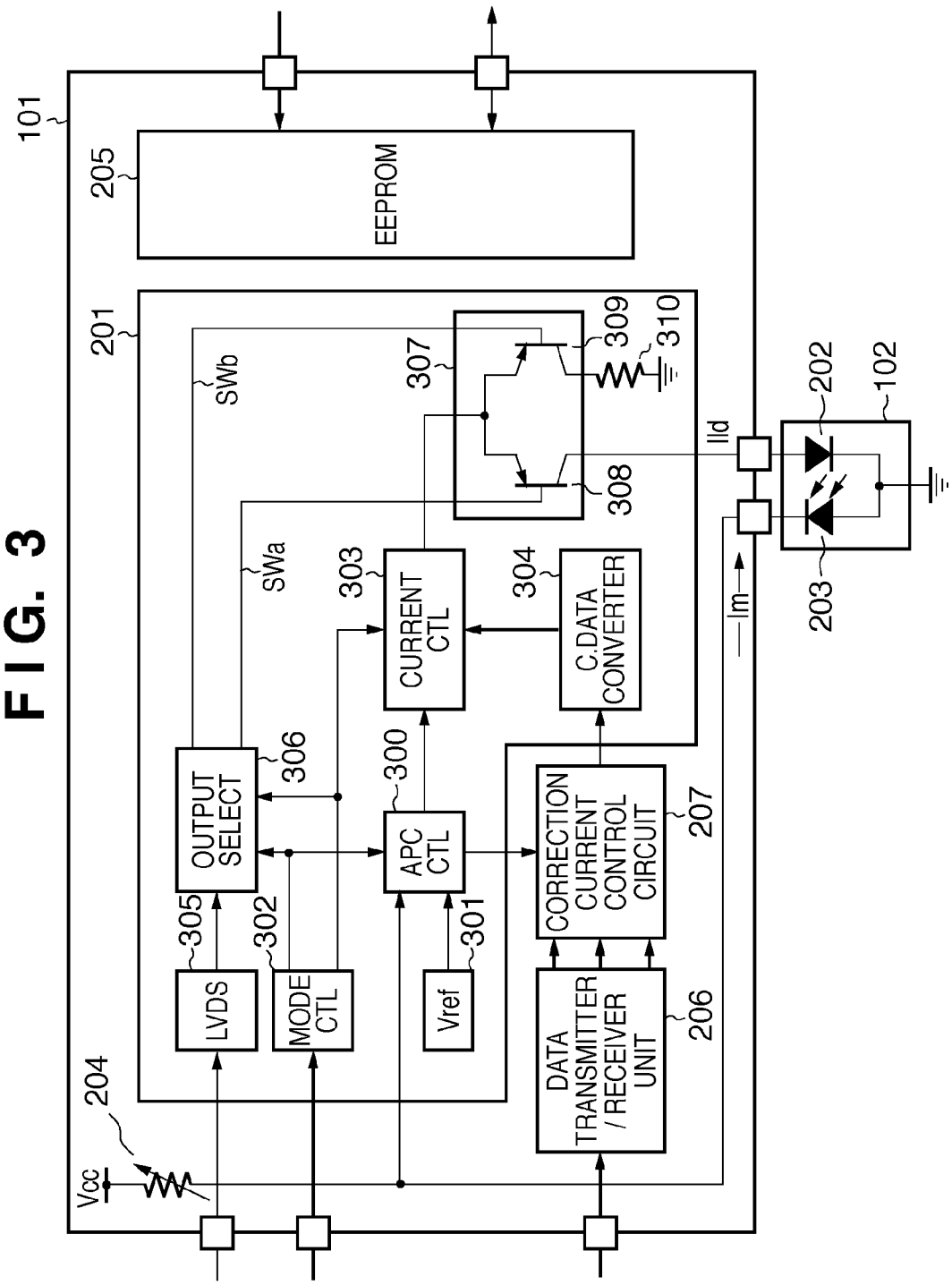
FIG. 3 is a block diagram showing details of a laser drive unit according to the first embodiment.

FIG. 3 is a block diagram showing details of the laser drive unit according to the present embodiment. A light power control circuit (APC CTL) 300 plays a central role in light power control. The light power control circuit (APC CTL) 300 receives, as input, a PD voltage signal corresponding to the PD current Im (described above) and a reference voltage outputted from a reference voltage generator circuit (Vref) 301.

A mode control circuit 302 switches among a plurality of control modes according to a mode control signal from the image control unit 220. The plurality of control modes include, for example, light power adjustment mode, current holding mode, and data output mode.

The light power adjustment mode is used in a non-image forming section in a scanning period of the laser beam, where no image is formed in the non-image forming section. The current-holding mode and data output mode are used in an image forming section in the scanning period of the laser beam, where an image is formed in the image forming section. The mode control circuit 302 supplies a signal indicating the current mode to the light power control circuit 300 and the like.

In the light power adjustment mode, the light power control circuit 300 compares the PD voltage signal with the reference voltage and adjusts an electrical current setting according to results of the comparison. A current control circuit (CURRENT CTL) 303 adjusts the drive current Ild supplied to the LD 202 according to the electrical current setting, and thereby maintains the light power of the laser beam output from the LD 202 at a predetermined value. Also, the current control circuit 303 adjusts the drive current Ild according to a correction current control signal from a correction data converter circuit (CORRECT DATA CONVERTER) 304 and the electrical current setting.

In the current-holding mode, the light power control circuit 300 maintains the electrical current setting made in the previous mode, that is, the light power adjustment mode.

In the data output mode, the current control circuit 303 outputs a drive current according to the differential data signal from the image control unit 220 and electrical current setting from the light power control circuit 300.

The current control circuit 303 is also connected to the correction data converter circuit 304. The correction data converter circuit 304 generates a correction current control signal based on correction current data from the correction current control circuit 207 and outputs the generated correction current control signal to the current control circuit 303. The correction current control signal is used to control the current control circuit 303 so as to keep the light power of the laser beam directed onto the surface of the photosensitive drum 110 at a predetermined uniform level. The correction current control circuit 207 generates the correction current data using light power data, coefficient data, and correction data received from the image control unit 220 via the data transmitter/receiver unit 206.

A differential receiver (LVDS) 305 is a circuit which receives the differential data signal from the image control unit 220. An output selector circuit (OUTPUT SELECT) 306 turns on and off switching signals SWa and SWb to be outputted to a current driver 307, according to the mode set by the mode control circuit 302. For example, in the light power adjustment mode, the switching signal SWa is turned on and the switching signal SWb is turned off. In the data output mode, the switching signals SWa and SWb are outputted according to a differential output signal outputted from the differential receiver 305.

The current driver 307 is a differential amplifier circuit constructed by connecting respective emitter terminals of a first transistor 308 and second transistor 309. A signal output from the current control circuit 303 is input in the emitter terminals. The switching signal Swa is inputted in a base terminal of the first transistor 308. The switching signal SWb is inputted in a base terminal of the second transistor 309. In this way, the first transistor 308 drives the LD 202 by switching based on the switching signals. The second transistor 309 drives a load resistor 310 by switching based on the signal outputted from the current control circuit 303 and the switching signal Swb.

Figure 4:
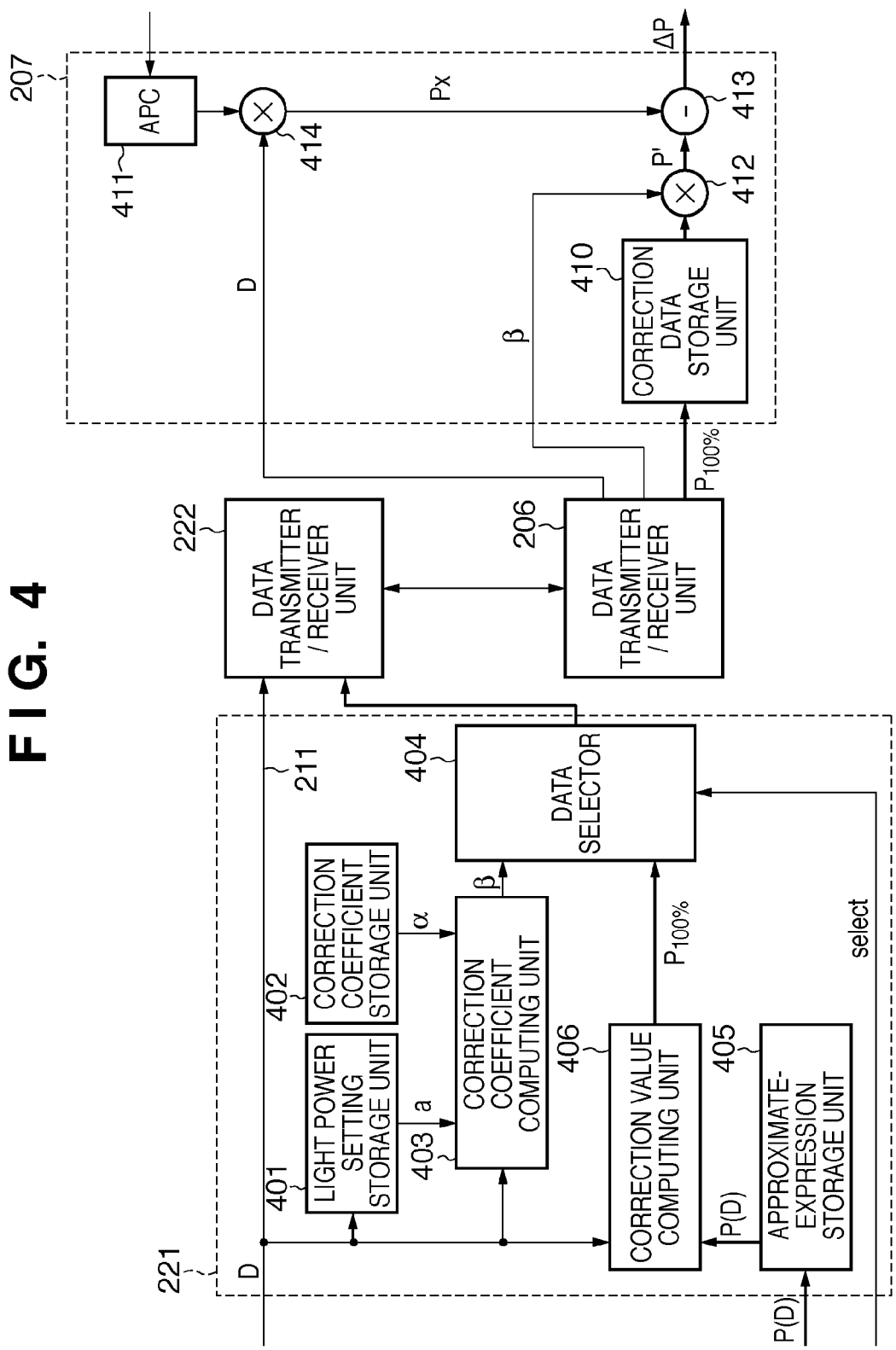
FIG. 4 is a block diagram showing a correction data generating unit 221 and correction current control circuit 207 according to the first embodiment.

FIG. 4 is a block diagram showing the correction data generating unit 221 and correction current control circuit 207 according to the present embodiment. A light power setting storage unit 401 is a storage device which stores the setting value D of light power transmitted from the engine control unit 210. A correction coefficient storage unit 402 is a storage device which stores a predetermined correction coefficient α.

When the setting value D of light power is changed (e.g., D=a→b), a correction coefficient computing unit 403 calculates a light power variation ΔD (ΔD=a+(b−a)) from the setting value "b" of light power after the change and stored data (i.e., the setting value "a" of light power before the change stored in the light power setting storage unit 401). Furthermore, the correction coefficient computing unit 403 produces a computed coefficient β (β=ΔD*α) using the correction coefficient α read out of the correction coefficient storage unit 402. The computed coefficient β is an example of the modification coefficient. On the other hand, the correction coefficient computing unit 403 is an example of the modification coefficient calculating unit which, when the setting value of light power is changed, calculates a modification coefficient by multiplying a difference between the setting value of light power before the change and the setting value of light power after the change by a predetermined correction coefficient. The correction coefficient computing unit 403 outputs the computed coefficient β to a data selector 404.

An approximate-expression storage unit 405 is a storage device which stores an m-th order approximate expression for correction P(D) obtained from the engine control unit 210 (where m is a natural number). The approximate expression for correction P(D) is created by the engine control unit 210 in advance and stored in the backup memory 230. The approximate expression for correction P(D) is used to calculate light power correction data P based on the setting value D of light power. Now an example of the approximate expression for correction P(D) will be described. For simplicity of explanation, it is assumed that the approximate expression is of second order.

$$P(D)=c1*D^2+c2*D+c3$$

where D is the setting value of light power described above and c1, c2, and c3 are coefficients calculated by the engine control unit 210 from correction count values S corresponding to different levels of corrected light power (e.g., 20%, 40%, . . . , 100%) stored in the EEPROM 205. The correction count values S will be described later. The basic approximate expression for correction P(D) in which no coefficient has been substituted may be stored, for example, in the backup memory 230 beforehand. The engine control unit 210 calculates and substitutes the coefficients into the basic approximate expression for correction and thereby completes the approximate expression for correction for each correction block. The correction blocks are obtained by segmenting image height (distance from the center of the laser beam trajectory) on the photosensitive drum 110 into multiple areas. Details of the correction blocks will be described later. The engine control unit 210 stores the completed approximate expressions for correction P(D) in the approximate-expression storage unit 405.

A correction value computing unit 406 reads out the approximate expression for correction P(D) for an appropriate correction block, substitutes the setting value D of light power into the approximate expression P(D), and thereby calculates correction data P. Furthermore, the correction value computing unit 406 calculates correction data $P_{100\%}$ for use when setting value D of light power=100% from the correction data P. The correction value computing unit 406 supplies the correction data $P_{100\%}$ to the data selector 404. Thus, the correction value computing unit 406 is an example of the correction data calculating unit which obtains light power at each of a plurality of image heights on the image carrier, substitutes the setting value of light power into an approximate expression for correction obtained from differences between the light power at a given image height and the light power at the other image heights, and thereby calculates correction data.

The data selector 404 outputs, to the data transmitter/receiver unit 222, the correction data $P_{100\%}$ or computed coefficient β according to a data selection signal "select" received from the engine control unit 210. The data transmitter/receiver unit 222 transmits these data to the data transmitter/receiver unit 206. The data transmitter/receiver unit 206 stores the received correction data $P_{100\%}$ in a correction data storage unit 410. The correction data storage unit 410 is an example of the storage unit which stores the calculated correction data.

Next, the correction current control circuit 207 will be described. A light power input control circuit (APC) 411 is an input circuit for a light power control signal output from the light power control circuit 300. A first multiplier 414 divides the light power control signal by the setting value D of light power and outputs the product Px to a subtracter 413. A second multiplier 412 multiplies the computed coefficient β by the correction data $P_{100\%}$ and thereby calculates a light power correction value P'. Thus, the second multiplier 412 is an example of the modification computing unit which calculates modified correction data by multiplying the correction data stored in the storage unit by the calculated modification coefficient.

$$P'=P_{100\%}*\beta.$$

The subtracter 413 subtracts the light power correction value P' from the product Px and thereby calculates a difference ΔP between them. The difference ΔP constitutes the correction current control signal of the correction data converter circuit 304 (described above).

[Method for Generating Correction Count Values S]

The correction count values S used to determine the approximate expression for correction P(D) will be described here.

Figure 5:
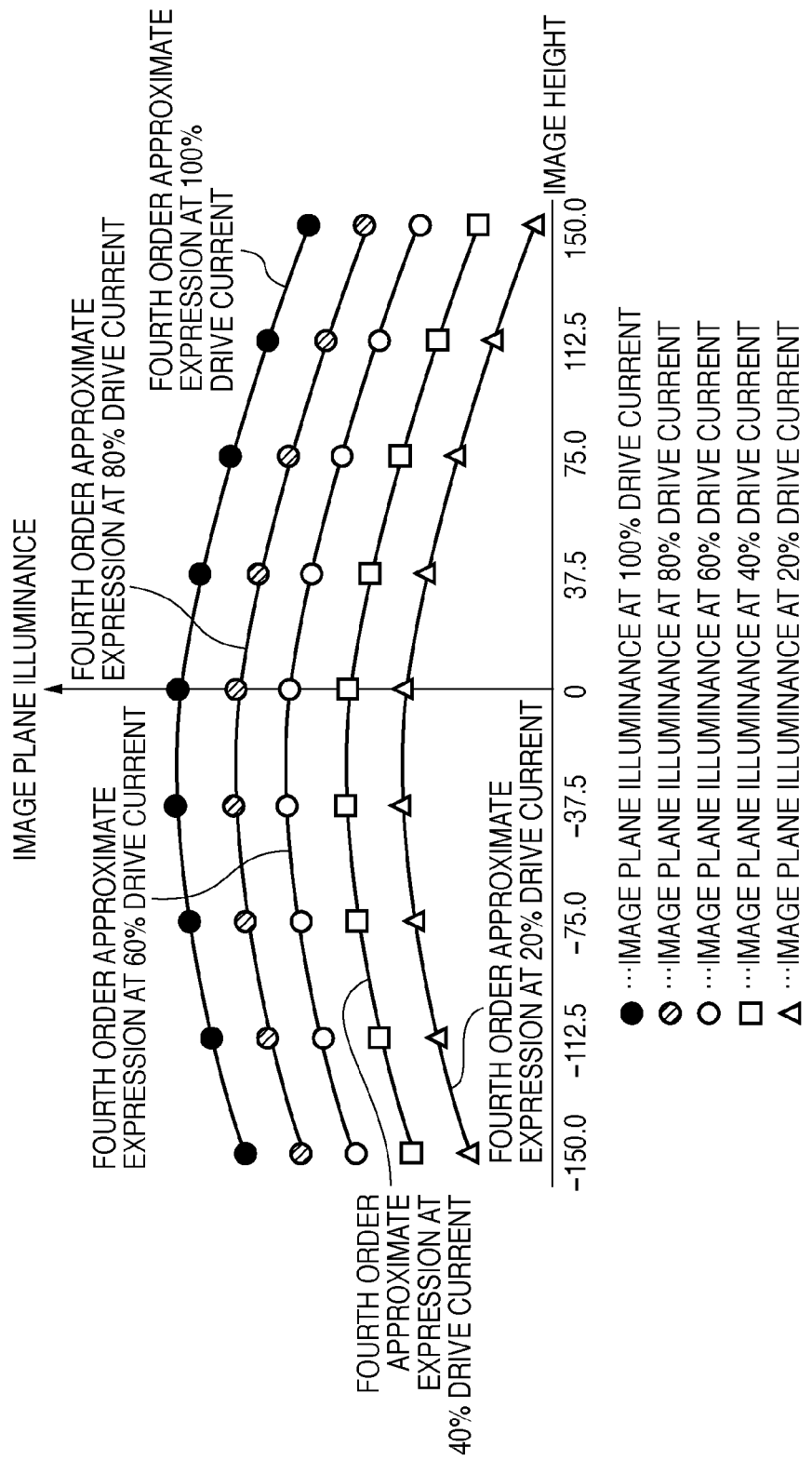
FIG. 5 is a diagram showing image plane distribution characteristics of the optical scanning apparatus 100.

FIG. 5 is a diagram showing image plane distribution characteristics of the optical scanning apparatus 100. For ease of understanding a method for generating the correction count values S, the specifications for generation of correction data shown below will be used here as an example.

Image height (in image area): ±150 mm
Number of image plane illuminance measurements/number of image heights: 9 (at 37.5 mm intervals)
Image plane illuminance/order of approximation: 4
Number of correction blocks: 25 (at 12.5 mm intervals)
Number of illuminance measurements: 5 (100%, 80%, 60%, 40%, 20%)
Resolution of laser drive current (Ild): 10 bits Image plane illuminance measurements are taken at nine measurement points (image heights in a range of ±150 mm) placed at 37.5 mm intervals in an image area of the photosensitive drum 110. Image plane illuminance measurements are taken, for example, using a fixture or the like at the factory. Alternatively, the image plane illuminance may be measured with a mobile light power sensor placed near the surface of the photosensitive drum 110. The light power sensor is moved close to the surface of the photosensitive drum 110, and retracted to a place sheltered from the laser beam when measurements are finished. Light power is obtained at a plurality of image heights on the image carrier using the light power sensor.

It is not strictly necessary to place the measurement points for the image plane illuminance measurement at equal intervals. In FIG. 5, four measurement points each are provided on the left and right of the center of a scanning surface of the photosensitive drum 110, with the center of the scanning surface serving as an origin (image height=0) of image height. Of course, the number of measurement points is nine in total.

Once illuminance is measured at the measurement points, the measurement point which provides the lowest illuminance is identified. In FIG. 5, the rightmost measurement point (image height=150.0), which provides the lowest illuminance, is extracted.

In the light power adjustment mode, the laser drive unit 101 adjusts resistance of the light power adjusting variable resistor 204 so as to set the illuminance of the identified measurement point to a predetermined value. The illuminance obtained in this way is defined to be 100% illuminance. Also, the laser drive current (Ild) which achieves the 100% illuminance will be referred as 100% light power drive current.

(1) Measuring Image Plane Illuminance

The engine control unit 210 measures image plane illuminance at 100% light power drive current at the nine measurement points. Next, the engine control unit 210 measures image plane illuminance similarly at 20%, 40%, 60%, and 80% light power drive currents at the nine measurement points.

(2) Determining Approximate Expression for Image Plane Illuminance

The engine control unit 210 determines an n-th order approximate expression (where n is a natural number) at each of the light power drive currents using the image plane illuminance measured at the nine measurement points. For convenience of explanation, it is assumed here that the order n is four. The n-th approximate expression for image plane illuminance is determined, for example, using illuminance data at image heights obtained when a laser beam is emitted at 20%, 40%, 60%, 80%, and 100% drive currents. In this case, since an approximate expression for image plane illuminance is determined at each of the 20%, 40%, 60%, 80%, and 100% drive currents, five approximate expressions for image plane illuminance are obtained in total. Image plane illuminance is determined at a common image height using each of the five approximate expressions for image plane illuminance and the m-th order approximate expression for correction P(D) is obtained as an equation which represents a relationship between the five values of the image plane illuminance and amounts of light emission (drive currents).

(3) Determining Correction Count Values S

Figure 6:
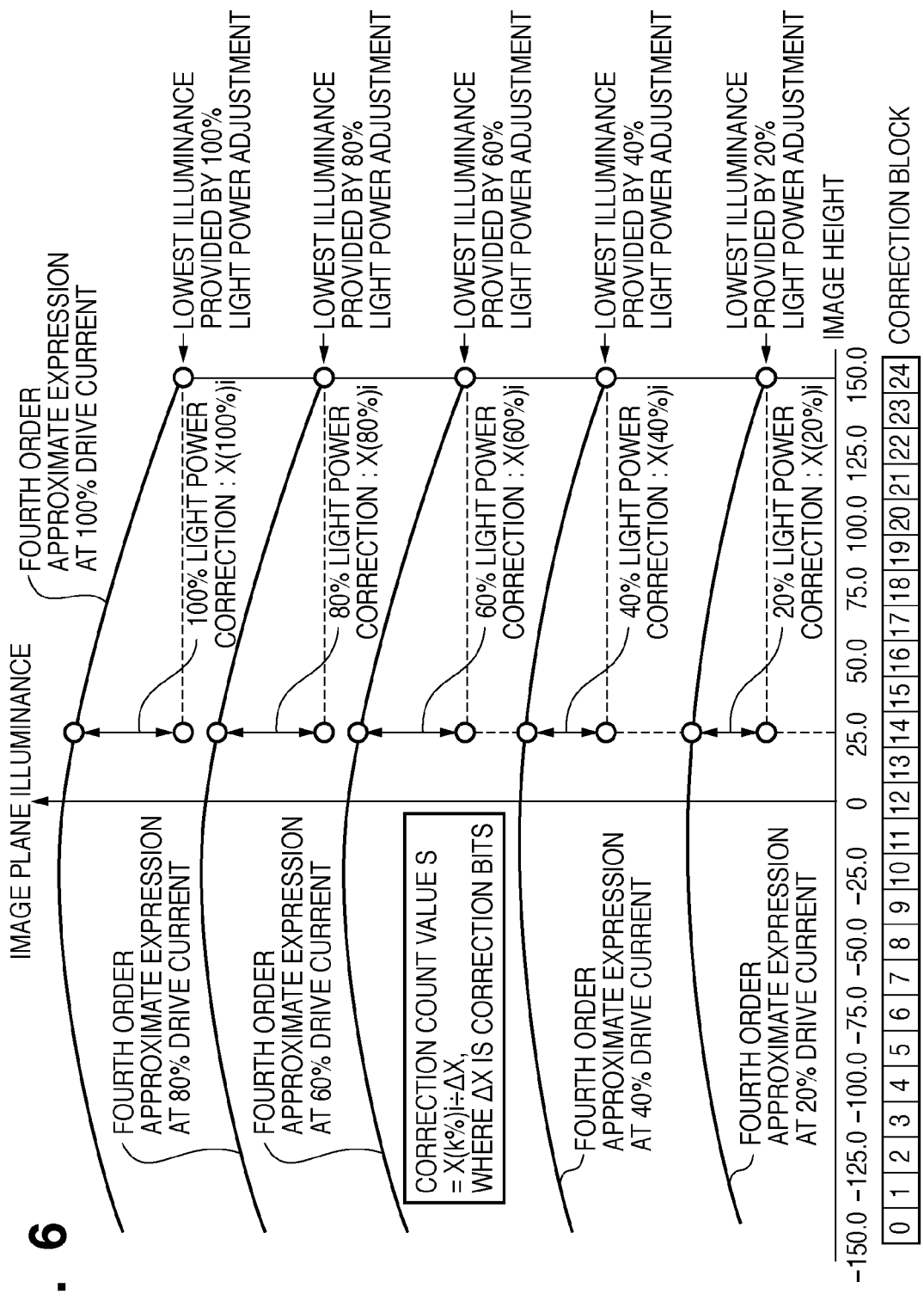
FIG. 6 is a diagram illustrating an example of how to calculate correction count values S according to the first embodiment.

FIG. 6 is a diagram illustrating an example of how to calculate the correction count values S according to the present embodiment. As shown in FIG. 6, 25 correction blocks are obtained by segmenting the image height (±150 mm) in the image area at 12.5 mm intervals. The engine control unit 210 calculates the image plane illuminance of each correction block by substituting the image height which represents the correction blocks into the generated approximate expression. The process of calculation is a kind of interpolation process. Furthermore, the engine control unit 210 determines the lowest value of the calculated image plane illuminance. In FIG. 6, it can be seen that the image plane illuminance of the 24-th correction block has the lowest value. Next, the engine control unit 210 calculates a difference (X(k %)i) in image plane illuminance between the correction block with the lowest value of image plane illuminance and each of the other correction blocks. Thus, the engine control unit 210 is an example of the correction data calculating unit which calculates differences between the light power at a given image height and the light power at the other image heights as correction data.

$X(k\%)i$=image plane illuminance of the *i-th* correction block–the lowest value of image plane illuminance where k % is the light power percentage (20% to 100%) described above and i is an identification number used to identify the correction blocks (i=0 to 24). Incidentally, the method for segmenting the image height into correction blocks is only an example, and another segmenting method may be used alternatively.

Next, the image plane illuminance difference (X(k %)i) is quantized based on resolution of the laser drive current (Ild) to calculate correction bits ΔX of the laser drive current. In this case, since the resolution of the laser drive current (Ild) is 10 bits, the correction bits ΔX are calculated using the following equation.

$$\Delta X = 100\% \text{ light power drive current}/1024$$

Thus, an arithmetic formula used to calculate the correction count values S is $S=X(k\%)i/\Delta X$. Similarly, the engine control unit 210 calculates the correction count values S for the image plane illuminance at 80%, 60%, 40%, and 20% light power drive currents. The engine control unit 210 stores the correction count values S thus calculated for each combination of a light power drive current and correction block in the EEPROM 205.

[Method for Generating Correction Data]

Figure 7:
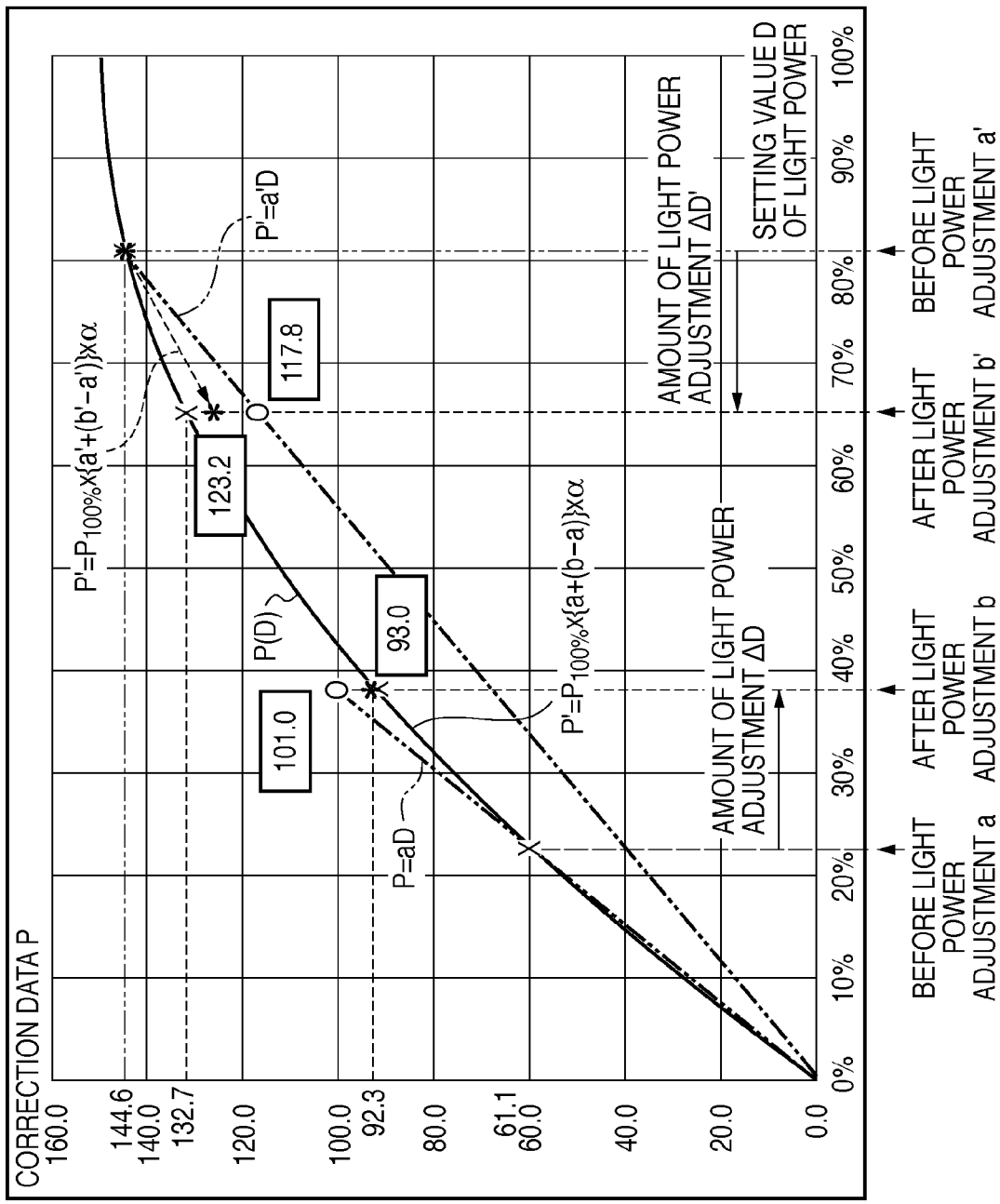
FIG. 7 is a diagram showing an example of correction data characteristics according to the first embodiment.

FIG. 7 is a diagram showing an example of correction data characteristics according to the present embodiment, where the abscissa represents the setting value D of light power and the ordinate represents the correction data P. The setting value D of light power is a variable value which is determined by the light power control signal and light power data. An m-th order approximate expression for correction is used in typical correction. Correction values thus obtained are indicated by x in FIG. 7. In high-speed mode, when the setting value D of light power changes from "a" to "b," correction values are determined based on a straight line which joins the origin and the points x obtained when D=a. The correction values are indicated by ○. Values obtained by multiplying the correction values by the correction coefficient α are indicated by *. The correction values indicated by * are closer to the correction values (x) obtained by the m-th order approximate expression for correction than the correction values indicated by ○.

The engine control unit 210 determines the approximate expression for correction P(D) from the correction count values S. That is, the engine control unit 210 calculates the coefficients c1, c2, and c3. It is assumed here that the order of the approximate expression for correction is 2, as described above. Also, it is assumed that c1=−150, c2=300, c3=0.

$$\text{Approximate expression for correction: } P(D) = -150D^2 + 300D = 150D(2-D)$$

Correction coefficient: α=0.8

Arithmetic formula for correction data: $P' = P_{100\%} * \beta$, where $\beta = a + (b-a) * \alpha$ $P_{100\%}$: correction data used when the setting value D of light power=100% (deduced from the correction data for the current setting value "a" of light power)

a: Current setting value of light power b: Setting value of light power after adjustment Example 1

When the setting value D of light power increases from 23% to 38%, the correction data is calculated as follows.

The correction data obtained using the approximate expression for correction P(D) is as follows.

When the setting value $D$ of light power=23%, the correction data $P(23\%) = 150*0.23*(2-0.23) = 61.1$ When the setting value $D$ of light power=38%, the correction data $P(38\%) = 150*0.38*(2-0.38) = 92.3$ The correction data obtained using the computed coefficient β is as follows.

$$P' = 265.7 * \{0.23 + (0.38 - 0.23) * 0.8\} = 93.0$$

Example 2

When the setting value D of light power decreases from 81% to 66%, the correction data is calculated as follows.

The correction data obtained using the approximate expression for correction P(D) is as follows.

When the setting value $D$ of light power=81%, the correction data $P(81\%) = 150*0.81*(2-0.81) = 144.6$ When the setting value $D$ of light power=66%, the correction data $P(66\%) = 150*0.66*(2-0.66) = 132.7$ The correction data obtained using the computed coefficient β is as follows.

$$P' = 178.5 * \{0.81 + (0.66 - 0.81) * 0.8\} = 123.2$$

In this way, various kind of correction data are calculated (FIG. 7).

Figure 8:
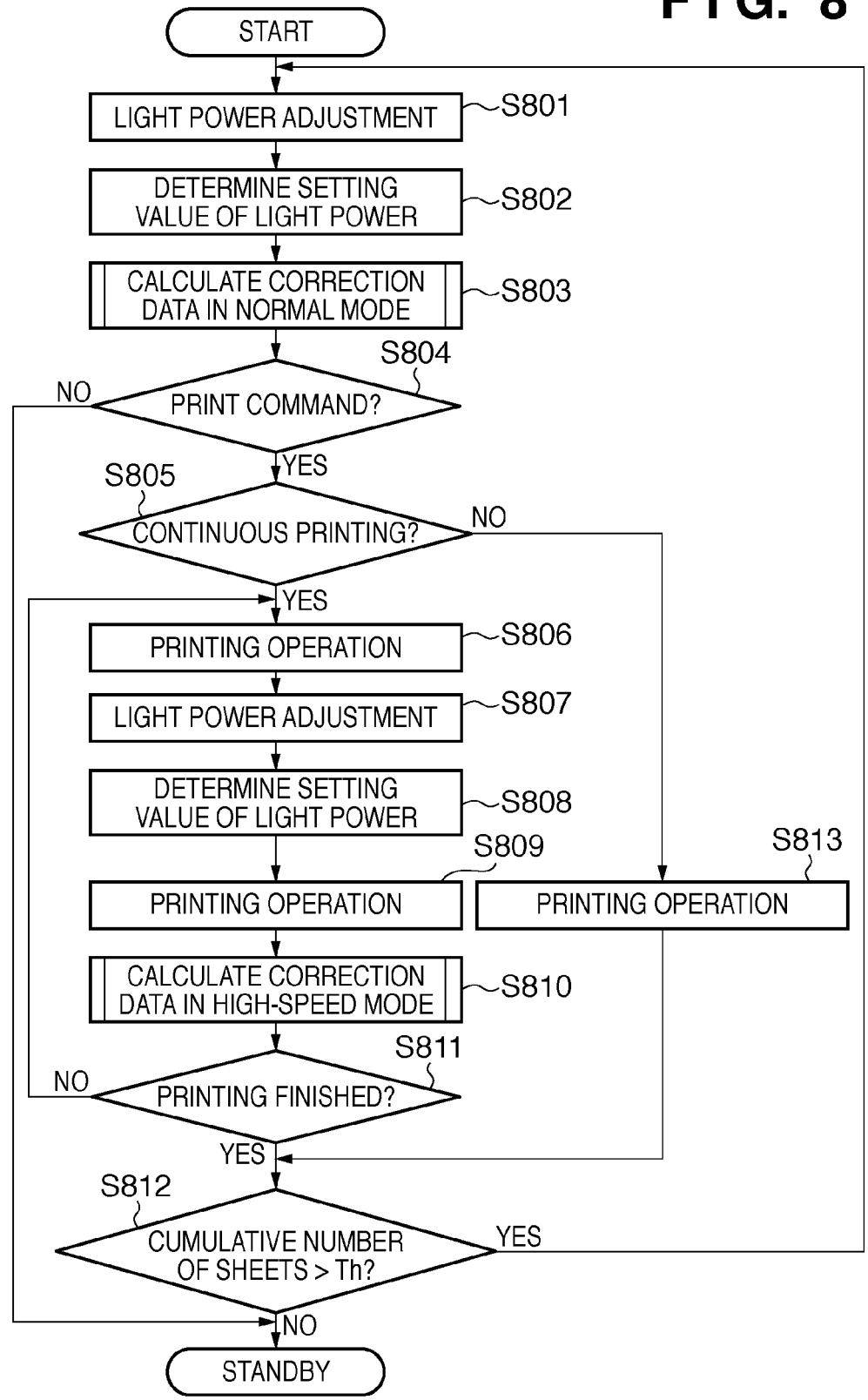
FIG. 8 is a flowchart showing a light power adjustment method performed by the image forming apparatus according to the first embodiment.

FIG. 8 is a flowchart showing a light power adjustment method performed by the image forming apparatus according to the present embodiment. The following processes are performed when the image forming apparatus is turned on.

In Step S801, the engine control unit 210 performs light power adjustment. In Step S802, the engine control unit 210 determines the setting value D of light power based on the results of light power adjustment. In Step S803, the engine control unit 210 selects normal mode and calculates correction data. Since the normal mode is selected here, correction data is updated. The normal mode involves a longer processing time than the high-speed mode, but has a higher control accuracy. Also, the normal mode is the first of the plurality of modes.

In Step S804, the engine control unit 210 determines whether a print command has been input. If no print command has been input, the engine control unit 210 is put on standby. On the other hand, if a print command has been input, the engine control unit 210 goes to Step S805. In Step S805, the engine control unit 210 determines whether the input print command specifies continuous printing. If continuous printing is not specified, the engine control unit 210 goes to Step S813 to perform a printing operation by driving the semiconductor laser 102 and the like.

On the other hand, if continuous printing is specified, the engine control unit 210 goes to Step S806. In Step S806, the engine control unit 210 performs a printing operation by driving the semiconductor laser 102 and the like. When the printing operation is finished, the engine control unit 210 performs light power adjustment in Step S807. In Step S808, the engine control unit 210 determines the setting value D of light power based on the results of light power adjustment. In Step S809, the engine control unit 210 performs a next printing operation. When the printing operation is finished, the engine control unit 210 selects high-speed mode and calculates correction data in Step S810. The high-speed mode has a lower control accuracy than the normal mode, but involves a shorter processing time. Also, the high-speed mode is the second of the plurality of modes.

In Step S811, the engine control unit 210 compares the number of sheets specified by the print command with the number of sheets actually printed and thereby determines whether the continuous printing has been finished. If the continuous printing has not been finished, the engine control unit 210 returns to Step S806. If the continuous printing has been finished, the engine control unit 210 goes to Step S812. In Step S812, the engine control unit 210 obtains a counter value to count a cumulative value (cumulative number of sheets) and determines whether the counter value exceeds a predetermined threshold Th. Incidentally, the counter is an example of an accumulator unit which accumulates the number of sheets printed on the image forming apparatus using the optical scanning apparatus. The predetermined threshold is updated, for example, every thousand sheets. For example, the threshold is updated, being set first to 1,000 sheets, next to 2,000 sheets, and so on. If the cumulative number of sheets exceeds the threshold Th, the engine control unit 210 returns to Step S801. Subsequently, the engine control unit 210 selects the normal mode and calculates correction data. If the cumulative number of sheets does not exceed the threshold Th, the image forming apparatus is put on standby.

According to the flowchart shown in FIG. 8, the high-speed mode is selected more frequently than the normal mode, reducing the processing time greatly. Incidentally, the engine control unit 210 also functions as a selection unit which selects a mode. That is, the engine control unit 210 selects the normal mode when the threshold Th for the number of printed sheets is exceeded, and selects the high-speed mode when the threshold Th is not exceeded.

In FIG. 8, the engine control unit 210 selects the normal mode if continuous printing is not designated. The engine control unit 210 selects the normal mode when continuous printing is designated and the threshold Th for the number of printed sheets is exceeded. On the other hand, the engine control unit 210 selects the high-speed mode as a second mode when the threshold Th for the cumulative number of sheets is not exceeded.

When the normal mode is selected, the engine control unit 210 functions as an adjustment unit which adjusts the drive current supplied to the light source using the correction data calculated by the correction data calculating unit. When the high-speed mode is selected, the engine control unit 210 functions as an adjustment unit which adjusts the drive current supplied to the light source using the correction data calculated by the modification computing unit.

Figure 9:
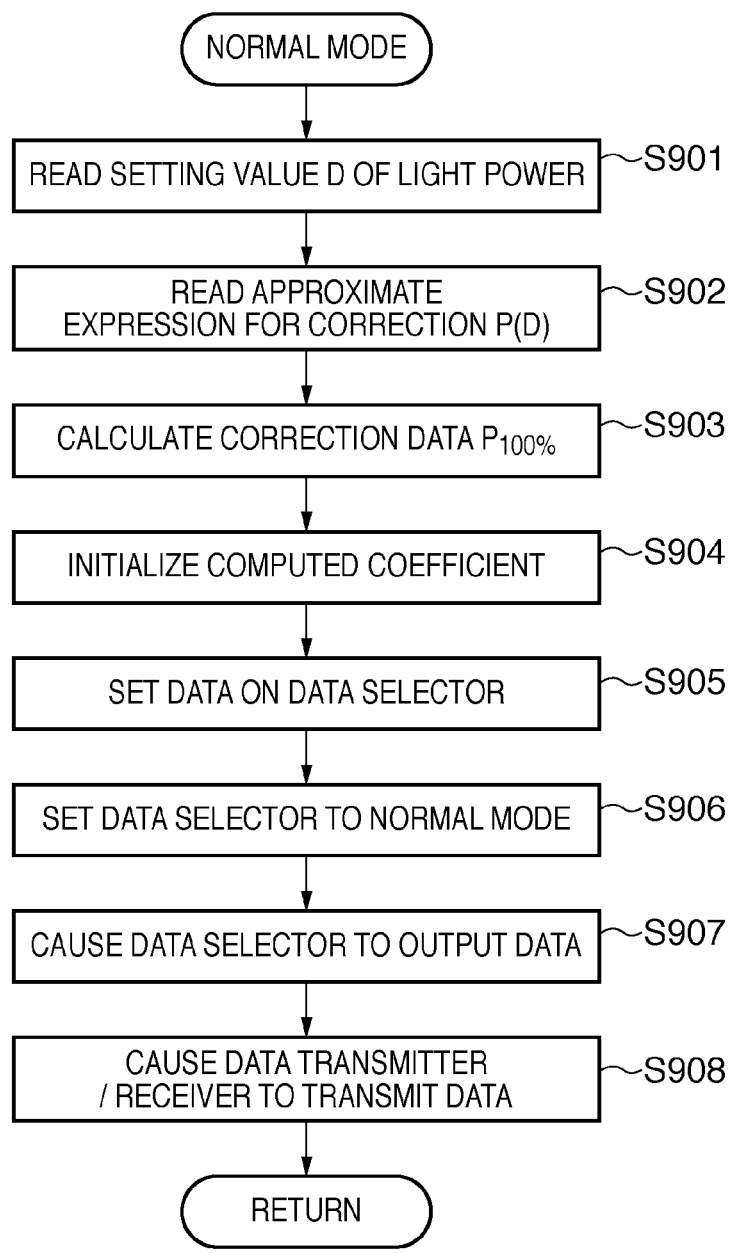
FIG. 9 is a flowchart showing a correction data generating method in normal mode according to the first embodiment.

FIG. 9 is a flowchart showing a correction data generating method in the normal mode according to the present embodiment. Step S803 described above will be described here in more detail.

In Step S901, the correction value computing unit 406 reads the setting value D of light power from the engine control unit 210. In Step S902, the correction value computing unit 406 reads the approximate expression for correction P(D) out of the approximate-expression storage unit 405. In Step S903, the correction value computing unit 406 substitutes the setting value D of light power into the approximate expression for correction P(D), and thereby calculates correction data $P_{100\%}$.

In Step S904, the correction coefficient computing unit 403 initializes the computed coefficient. The initialization involves, for example, substituting 0 into a light power variation ΔD. In Step S905, the correction value computing unit 406 sets the correction data $P_{100\%}$ on the data selector 404. In Step S906, the engine control unit 210 sets output mode of the data selector 404 to the normal mode. In Step S907, the data selector 404 generates a correction value output signal by selecting data and information to be output in the normal mode and outputs the correction value output signal to the data transmitter/receiver unit 222. In Step S908, the data transmitter/receiver unit 222 converts the correction value output signal into a serial signal and transfers the serial signal to the laser drive unit 101. The number of signal transfers is at least equal to the number of correction blocks.

Figure 10:
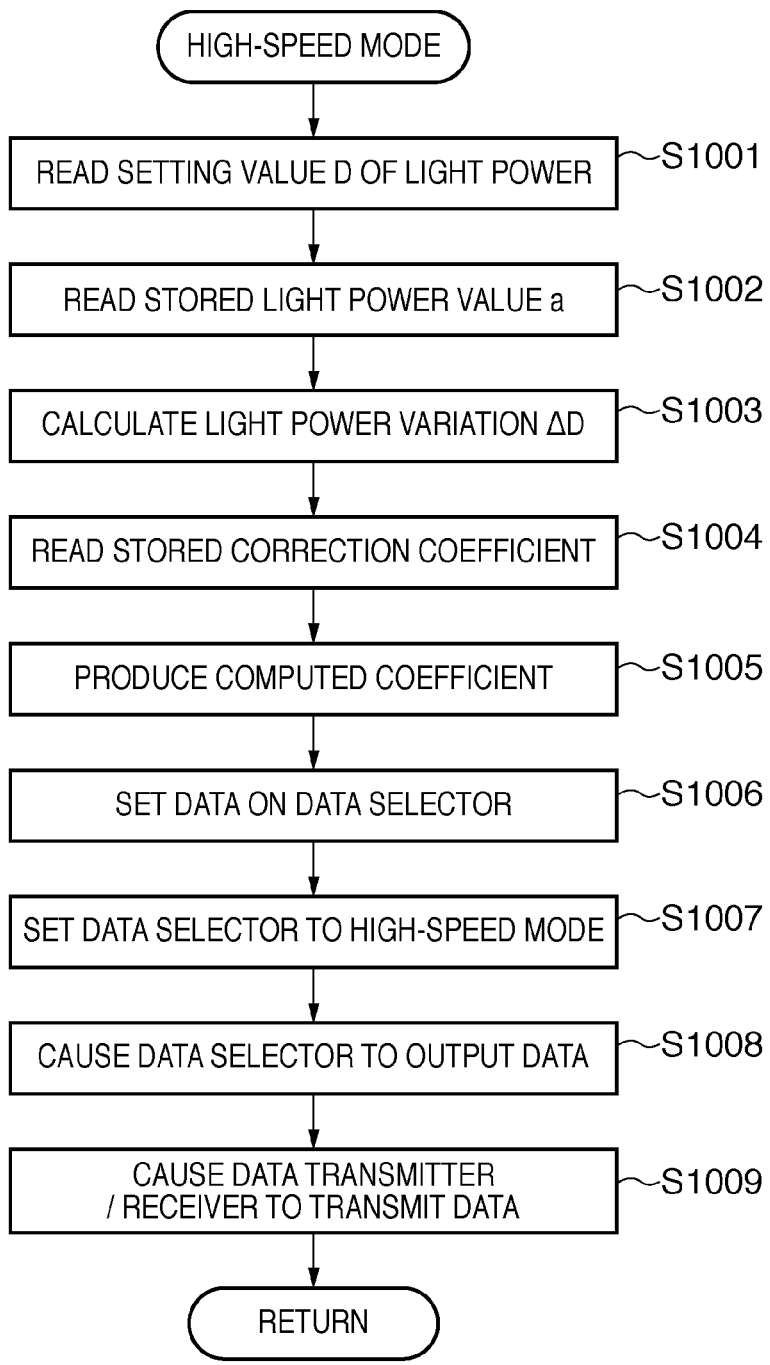
FIG. 10 is a flowchart showing a correction data generating method in high-speed mode according to the first embodiment.

FIG. 10 is a flowchart showing a correction data generating method in the high-speed mode according to the present embodiment. Step S810 described above will be described here in more detail.

In Step S1001, the correction coefficient computing unit 403 reads the setting value D of light power from the engine control unit (D=a). In Step S1002, the correction coefficient computing unit 403 reads the previous setting value "a" of light power (stored light power value) out of the light power setting storage unit 401.

In Step S1003, the correction coefficient computing unit 403 calculates the light power variation ΔD which is a difference between the setting value "b" of light power and the stored light power value "a." In Step S1004, the correction coefficient computing unit 403 reads the correction coefficient α out of the correction coefficient storage unit 402.

In Step S1005, the correction coefficient computing unit 403 multiplies the light power variation AD by the correction coefficient α and thereby produces the computed coefficient β. In Step S1006, the correction coefficient computing unit 403 sets the computed coefficient β on the data selector 404.

In Step S1007, the engine control unit 210 sets the output mode of the data selector 404 to the high-speed mode. In Step S1008, the data selector 404 outputs the computed coefficient β to the data transmitter/receiver unit 222. In Step S1009, the data transmitter/receiver unit 222 converts the computed coefficient β into a serial send/receive signal and transfers the serial send/receive signal. This time, the number of transfers may be at least one.

As described above, the present embodiment switches between the normal mode and high-speed mode depending on the situation, where the normal mode involves a longer processing time, but has a higher control accuracy while the high-speed mode has a lower control accuracy, but involves a shorter processing time. This makes it possible to reduce the time required for light power control while maintaining image quality.

The engine control unit 210, which selects the high-speed mode more frequently than the normal mode, can greatly reduce the processing time. The larger the number of sheets to be printed, the more likely optical characteristics and the like have fluctuated. Thus, if the mode is switched according to the number of sheets, it will be easier to maintain control accuracy even in the presence of fluctuations with time. In particular, when continuous printing is designated, exceeding a threshold for the number of sheets, it will be preferable to use the normal mode because the optical characteristics are liable to fluctuate. Conversely, if the threshold for the number of printed sheets is not exceeded, it is highly likely that fluctuations in the optical characteristics are insignificant even if continuous printing is designated. In that case, it will be desirable to reduce the processing time using the high-speed mode.

Second Embodiment

The present embodiment, which is an improved version of the first embodiment, allows selection among a plurality of correction coefficients according to the setting value of light power.

Figure 11:
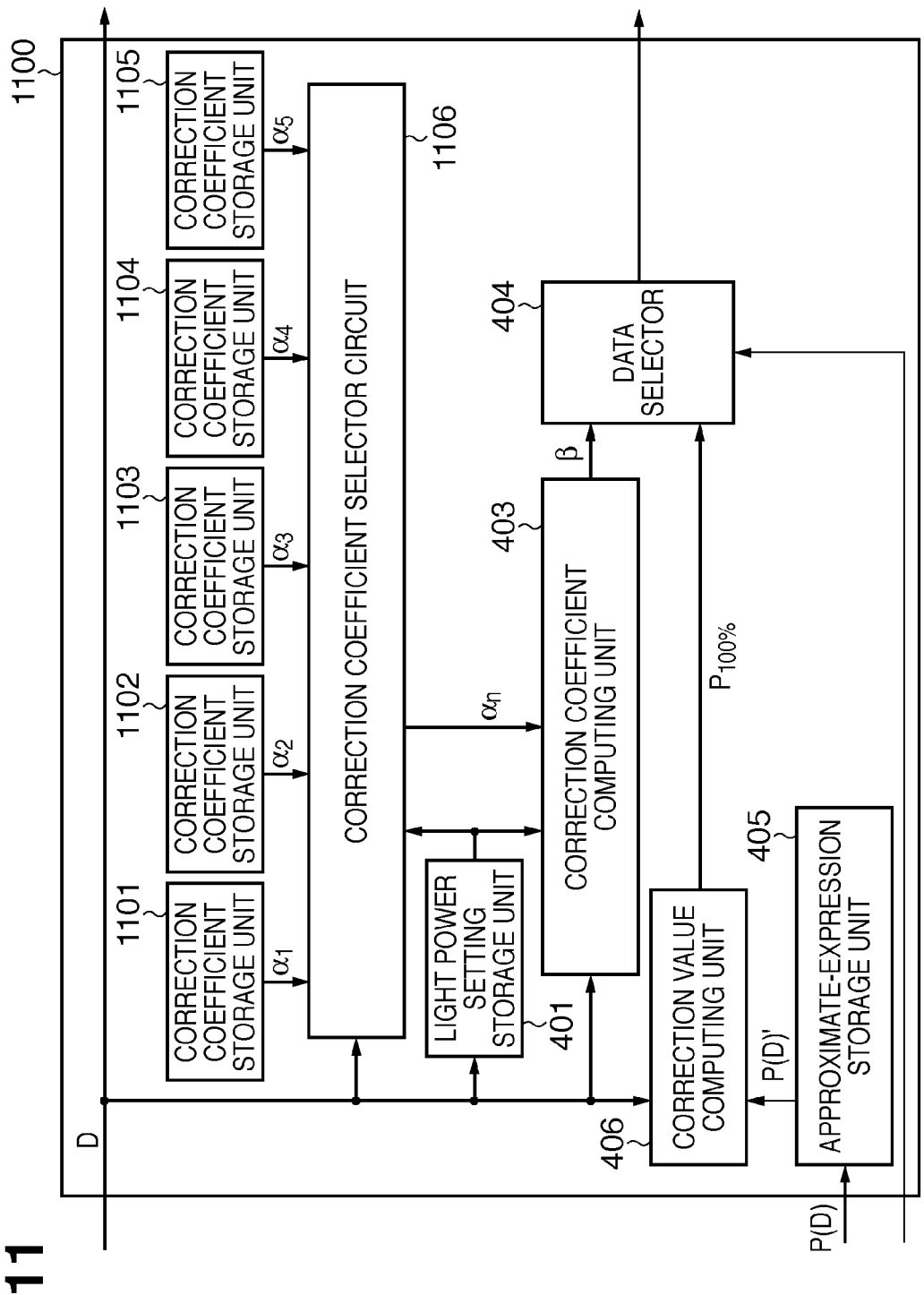
FIG. 11 is a block diagram showing an example of a correction data generating unit according to a second embodiment.

FIG. 11 is a block diagram showing an example of a correction data generating unit according to the present embodiment, where the components already described are denoted by the same reference numerals/characters as the corresponding components and will be described briefly. As can be seen from comparison with the correction data generating unit 221 shown in FIG. 4, a correction data generating unit 1100 has first to fifth correction coefficient storage units 1101 to 1105 and a correction coefficient selector circuit 1106 instead of the correction coefficient storage unit 402.

The first to fifth correction coefficient storage units 1101 to 1105 store different correction coefficients $\alpha 1$ to $\alpha 5$. The correction coefficients correspond to different setting values D of light power. For example, when possible setting values D of light power are divided into five groups, the correction coefficient $\alpha 1$ is determined for the first group which contains the smallest values and the correction coefficient $\alpha 2$ is determined for the second group which contains the second smallest values. Similarly, $\alpha 3$ and $\alpha 4$ are determined. Finally, the correction coefficient $\alpha 5$ is determined for the fifth group which contains the largest values.

The correction coefficient selector circuit 1106 reads the appropriate correction coefficient for an input setting value D of light power out of the correction coefficient storage unit and outputs the appropriate correction coefficient to the correction coefficient computing unit 403. If the input setting value D of light power belongs to the first group, the correction coefficient selector circuit 1106 reads the correction coefficient $\alpha 1$ out of the correction coefficient storage unit 1101. Thus, the correction coefficient selector circuit 1106 is an example of the selector unit which selects appropriate correction coefficient for an input setting value of light power from a plurality of correction coefficients and passes the selected correction coefficient to the modification coefficient calculating unit.

When the setting value D of light power is changed as a result of light power adjustment (e.g., D=c=>d), the correction coefficient computing unit 403 calculates a light power variation $\Delta D$ ($\Delta D$=c+(d−c)) from the setting value d of light power after the change and the setting value c of light power before the change stored in the light power setting storage unit 401. Furthermore, the correction coefficient computing unit 403 produces a computed coefficient $\beta$ ($\beta=\Delta D*\alpha n$) using the correction coefficient $\alpha n$ output from the correction coefficient selector circuit 1106 and outputs the computed coefficient $\beta$ to the data selector 404. The correction coefficient $\alpha n$ is one of $\alpha 1$ to $\alpha 5$.

Figure 12:
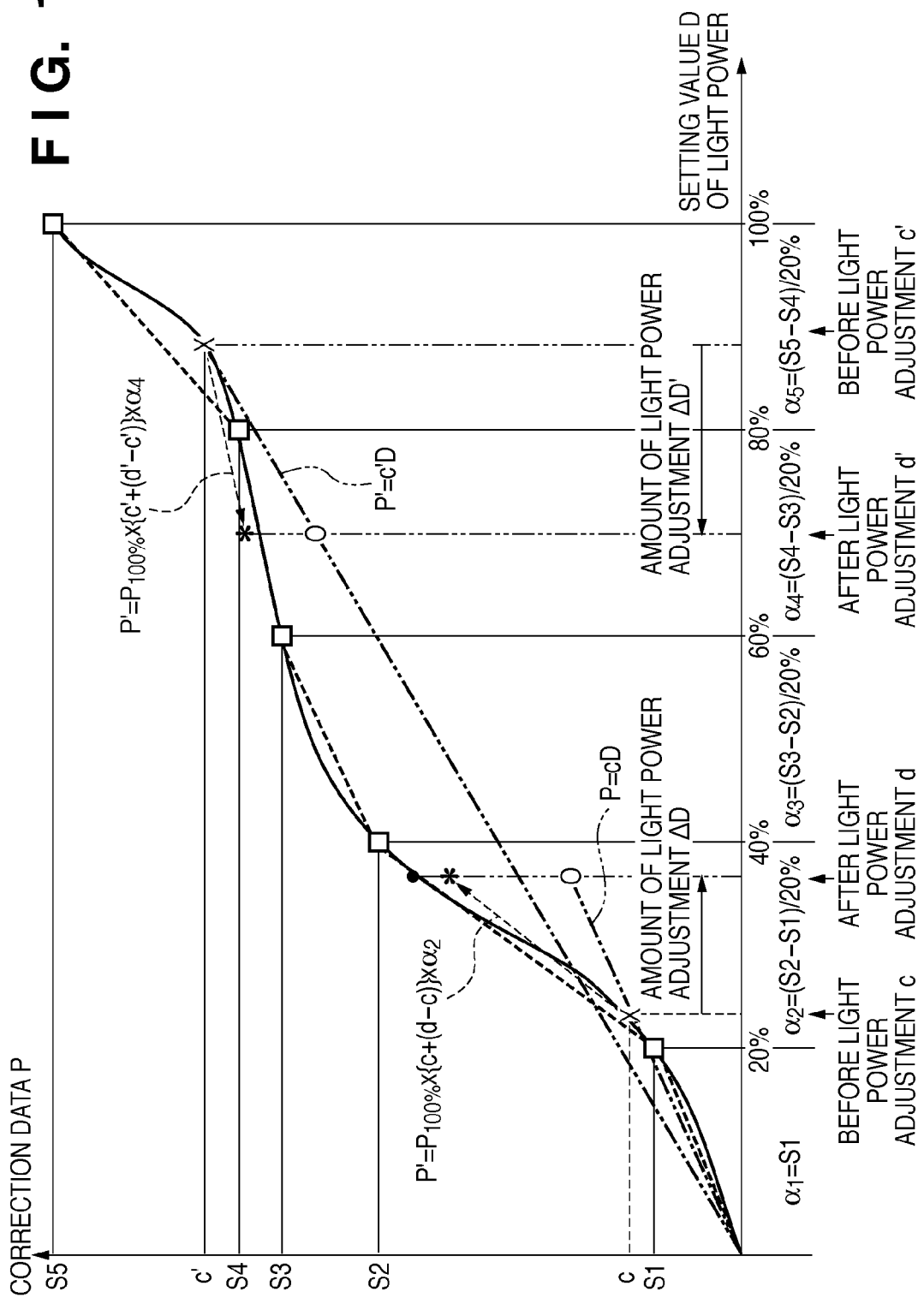
FIG. 12 is a diagram illustrating a concept of a correction data generating method according to the second embodiment.

FIG. 12 is a diagram illustrating a concept of a correction data generating method according to the present embodiment, where the abscissa represents the setting value D of light power and the ordinate represents the correction data P. The correction coefficients $\alpha 1$ to $\alpha 5$ are generated from the correction count values S stored in the backup memory 230 or the EEPROM 205. One of the plurality of correction coefficients $\alpha 1$ to $\alpha 5$ is selected here according to the setting value D of light power.

For example, the correction coefficient $\alpha 1$ stored in the correction coefficient storage unit 1101 is calculated from the correction count value S1 for 20% light power ($\alpha 1$=S1). The correction coefficient $\alpha 2$ stored in the correction coefficient storage unit 1102 is calculated from the correction count value S2 for 40% light power ($\alpha 2$=(S2−S1)/20%). Similarly, $\alpha 3$=(S3−S2)/20%, $\alpha 4$=(S4−S3)/20%, and $\alpha 5$=(S5−S4)/20%, where S3 is the correction count value for 60% light power, S4 is the correction count value for 80% light power, and S5 is the correction count value for 100% light power. The correction coefficients are calculated by the engine control unit 210.

It is assumed that the correction coefficients $\alpha n$ are common to all the correction blocks. Also, as shown in FIG. 12, when the setting value of light power changes from c' belonging to a fifth block to d' belonging to a fourth block, the correction coefficient selector circuit 1106 selects the correction coefficient $\alpha 4$ for a fourth block. However, the present invention is not limited to this, and the correction coefficient $\alpha 5$ for the fifth block may be selected.

The present embodiment can improve the accuracy of light power control by selecting an appropriate correction coefficient for the setting value of light power from a plurality of correction coefficients. Of course, this also makes it easier to maintain image quality.

Third Embodiment

Figure 13:
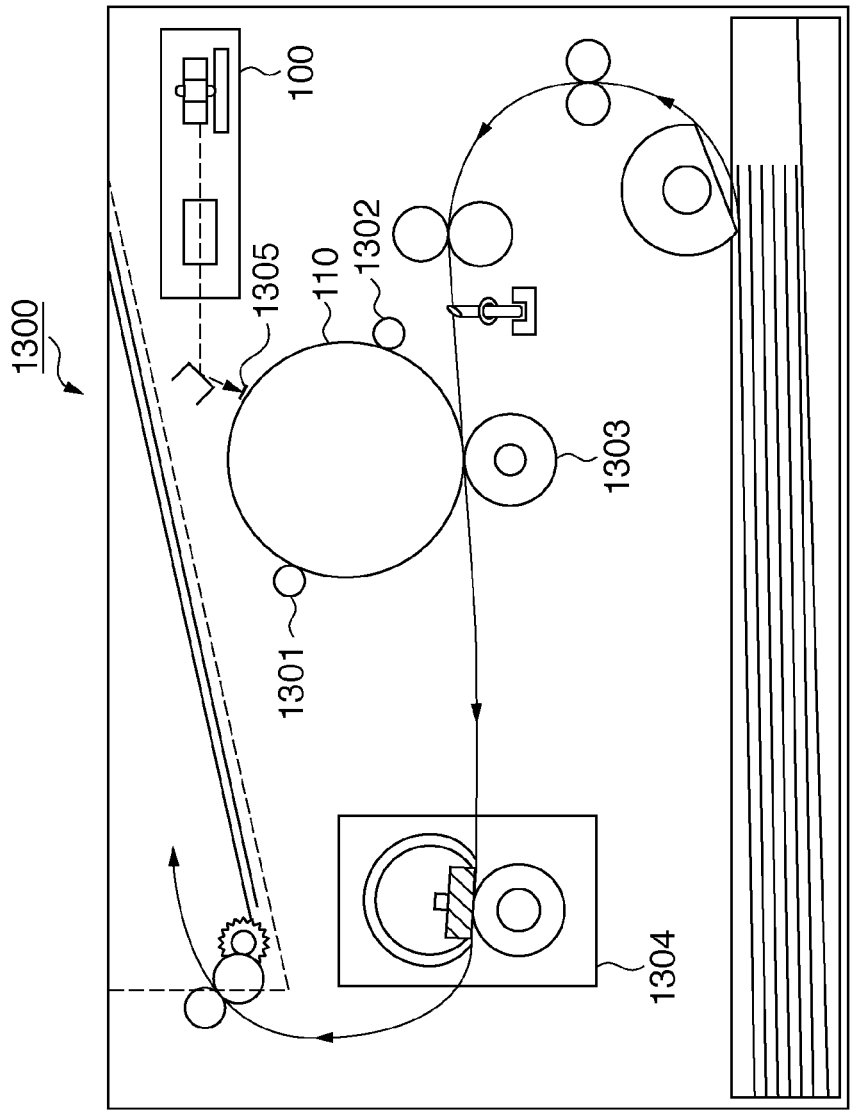
FIG. 13 is a schematic sectional view of an image forming apparatus according to a third embodiment.

Now, an image forming apparatus will be described as an application example of the optical scanning apparatus 100 described above. FIG. 13 is a schematic sectional view of an image forming apparatus according to a third embodiment. The image forming apparatus 1300 forms monochrome or multicolor images. For example, the image forming apparatus 1300 is implemented as a printing apparatus, image output apparatus, printer, copier, multifunction device, or facsimile machine.

The optical scanning apparatus 100 scans a light beam over the surface of the photosensitive drum 110 charged uniformly by a charger 1301. Consequently, a latent image corresponding to an image signal is formed on the photosensitive drum 110 which is an example of the image carrier. The latent image is converted into a developer (e.g., toner) image by a developing apparatus 1302. The developer image is transferred to a recording medium by a transferring apparatus 1303. A fixing apparatus 1304 fixes the developer image on the recording medium to which the developer image has been transferred from the photosensitive drum 110. The recording medium is also referred to as recording paper, paper, sheets, transfer material, and the like.

A light power sensor 1305 obtains light power at each of a plurality of image heights on the image carrier. During image formation, the light power sensor 1305 retracts to avoid blocking the laser beam. During light power measurement, the light power sensor 1305 moves to a place where the laser beam can be received. Incidentally, a half mirror may be installed to allow a main part of the light power to expose the image carrier by passing through the half mirror and allow some part of the light power to be received by the light power sensor 1305. This has the advantage of eliminating the need for a moving mechanism of the light power sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-174570, filed Jul. 2, 2007, which is hereby incorporated by reference herein in its entirety.

What is claimed is:

1. An image forming apparatus comprising:
a light source configured to output a light beam;
a rotational polygonal mirror configured to deflect the light beam output from the light source such that the light beam scans on a a photosensitive member;
an optical unit configured to guide the light beam deflected by the rotational polygonal mirror onto the photosensitive member;
a storage unit configured to store a plurality of correction data corresponding to a plurality of reference current values respectively, the plurality of correction data to corrects light amount of the light beam guided onto the photosensitive member by the optical unit to target light amounts corresponding to a plurality of positions in a scanning direction in which the light beam scans on the photosensitive member;

a setting unit configured to set a light amount setting value of the light beam;

a data generating unit configure to generate a first interpolation data or a second interpolation data for the plurality of positions, the first interpolation data being an approximate expression of degree n for interpolating correction data between the plurality of reference current values based on the plurality of correction data corresponding to the plurality of reference current values stored in the storage unit, and the second interpolation data being a linear expression for interpolating between a previous light amount setting value to be changed by the setting unit and a reference current value; and a control unit configured to control light amount of the light beam to a target light amount for the plurality of positions in the scanning direction based on the first interpolation data and the light amount setting value in a case where an image is formed by a first mode, and control light amount of the light beam to a target light amount for the plurality of positions in the scanning direction based on the second interpolation data and the light amount setting value in a case where an image is formed by a second mode, wherein image quality of an image formed by the first mode is higher than image quality of an image formed by the second mode.

2. The image forming apparatus according to claim 1, further comprising an accumulator unit configured to accumulate the number of sheets on which the image are formed by the image forming apparatus, wherein the control unit further configured to select the first mode when the number of printed sheets exceeds a threshold, and select the second mode when the number of printed sheets does not exceed the threshold.

3. The image forming apparatus according to claim 1, wherein the control unit further configured to select the first mode when continuous printing is not designated or when continuous printing is designated and the threshold for the number of printed sheets is exceeded, and select the second mode when the threshold for the number of printed sheets is not exceeded.

4. An image forming apparatus according to claim 1 further comprising a charger configured to charge the photosensitive member;

a developing apparatus configured to form a developer image by developing a latent image formed by the light beam scanned by the rotational polygonal mirror;

a transferring apparatus configured to transfer the developer image to recording paper; and a fixing apparatus configured to fix the transferred developer image on the recording paper.

5. The image forming apparatus according to claim 1, wherein the first interpolation data is the approximate expression of degree n for interpolating between two correction data which are closest to the light amount setting value set by the setting unit.

* * * * *